(12) United States Patent
Veillette et al.

(10) Patent No.: US 7,818,276 B2
(45) Date of Patent: Oct. 19, 2010

(54) INTELLIGENT MONITORING SYSTEM AND METHOD FOR BUILDING PREDICTIVE MODELS AND DETECTING ANOMALIES

(75) Inventors: Michel Veillette, St-Bruno (CA); Said Berriah, Laval (CA); Gilles Tremblay, Montréal (CA)

(73) Assignee: Recherche 2000 Inc., Montreal (CA)

( * ) Notice: Subject to any disclaimer, the term of this patent is extended or adjusted under 35 U.S.C. 154(b) by 521 days.

(21) Appl. No.: 11/671,205

(22) Filed: Feb. 5, 2007

(65) Prior Publication Data

US 2007/0265713 A1 Nov. 15, 2007

Related U.S. Application Data

(60) Provisional application No. 60/764,780, filed on Feb. 3, 2006.

(51) Int. Cl.
G06F 17/00 (2006.01)
(52) U.S. Cl. ............... 706/47; 700/29; 700/30; 700/40
(58) Field of Classification Search ............ 700/29, 700/30, 40; 706/21, 47
See application file for complete search history.

(56) References Cited

U.S. PATENT DOCUMENTS

| | | | |
|---|---|---|---|
| 6,393,373 B1 * | 5/2002 | Duyar et al. ............... 702/115 |
| 6,473,658 B1 | 10/2002 | Brose et al. | |
| 6,513,025 B1 * | 1/2003 | Rosen ...................... 706/45 |
| 6,564,119 B1 * | 5/2003 | Vaculik et al. ............ 700/146 |
| 6,591,146 B1 * | 7/2003 | Pavlovic et al. ............. 700/29 |
| 6,731,990 B1 * | 5/2004 | Carter et al. ................ 700/52 |
| 6,801,810 B1 * | 10/2004 | Poncet ...................... 700/12 |
| 6,853,920 B2 * | 2/2005 | Hsiung et al. ................. 702/1 |
| 6,859,739 B2 * | 2/2005 | Wegerich et al. ............. 702/32 |
| 6,898,469 B2 * | 5/2005 | Bickford .................... 700/30 |
| 6,917,839 B2 * | 7/2005 | Bickford .................... 700/30 |
| 6,917,845 B2 * | 7/2005 | Hsiung et al. .............. 700/104 |
| 6,920,440 B1 * | 7/2005 | Barson ..................... 706/21 |
| 6,947,797 B2 * | 9/2005 | Dean et al. ................. 700/79 |
| 6,952,657 B2 | 10/2005 | Jahns et al. | |
| 6,985,779 B2 * | 1/2006 | Hsiung et al. .............. 700/19 |
| 7,257,451 B2 * | 8/2007 | Carpency et al. ............ 700/30 |

(Continued)

OTHER PUBLICATIONS

Shlens. A Tutorial on Principal Component Analysis. Systems Neurobiology Laboratory, Salk Insitute for Biological Studies La Jolla, CA 9203. Dec. 10, 2005.*

(Continued)

Primary Examiner—Michael B. Holmes
Assistant Examiner—David H Kim
(74) Attorney, Agent, or Firm—Ogilvy Renault LLP

(57) ABSTRACT

There is described a method and system for detecting an anomaly in data originating from a component used in an industrial process. The anomaly detection steps comprise: providing predictive models in which at least one of the predictive models corresponds to at least one operating mode from a plurality of operating modes of the component; obtaining operating data from the component, the operating data being indicative of a given operating mode from the operating modes; selecting at least one of the predictive models based on the given operating mode; generating estimated data using the selected at least one predictive model; comparing the operating data with the estimated data; and generating an alarm trigger when the comparison meets a given anomaly criteria thereby constituting the detection of the anomaly.

27 Claims, 4 Drawing Sheets

U.S. PATENT DOCUMENTS

| | | |
|---|---|---|
| 7,317,953 B2* | 1/2008 | Wojsznis et al. .............. 700/28 |
| 7,447,554 B2* | 11/2008 | Cutler ......................... 700/38 |
| 2002/0002414 A1* | 1/2002 | Hsiung et al. ................. 700/95 |
| 2002/0165842 A1* | 11/2002 | Hellerstein et al. ............ 706/47 |
| 2003/0065409 A1* | 4/2003 | Raeth et al. ................... 700/31 |
| 2005/0273296 A1* | 12/2005 | Zhu et al. ................... 702/181 |
| 2006/0089731 A1* | 4/2006 | Kawakatsu et al. ........... 700/46 |
| 2006/0106743 A1* | 5/2006 | Horvitz ....................... 706/21 |
| 2006/0173559 A1* | 8/2006 | Kirshenbaum et al. ........ 700/31 |
| 2007/0135938 A1* | 6/2007 | Subbu et al. .................. 700/30 |
| 2007/0293957 A1* | 12/2007 | Tanaka et al. ................. 700/30 |

OTHER PUBLICATIONS

Nisiya et al. Dynamic state estimation including anomaly detection and identification for power systems. IEE Proc, vol. 12*9, Pt. C, No. 5, Sep. 1982.*

PCT International Search Report, Form PCT/ISA/210 pp. 1-3.

* cited by examiner

INTELLIGENT MONITORING SYSTEM AND METHOD FOR BUILDING PREDICTIVE MODELS AND DETECTING ANOMALIES

CROSS-REFERENCE TO RELATED APPLICATIONS

This application claims priority under 35US§119(e) of U.S. provisional patent application 60/764,780, filed on Feb. 3, 2006 and entitled Monitoring System and Method for Building Predictive Models and Detecting Anomalies, the specification of which is hereby incorporated by reference.

FIELD

The present description relates to methods and systems for diagnosing and profiling any industrial process based on state-of-the-art data analysis methods.

BACKGROUND

Controlling and monitoring large-scale industrial assets (e.g., chemical plants, fuel cells, power turbines, nuclear power plants, etc) often generates a huge amount of data. This data characterizes the complex dynamic behaviour of each asset (or component).

Commonly, there are two approaches in model-based diagnosis. The fist attempts to model the faulty behavior of a process. This approach tries to recognize the fault patterns from the available data. However, faulty conditions are rare and it takes a long time to build enough fault patterns to be efficient. The same fault can execute differently and may be not recognized by this method.

Another approach is to model normal behavior and to signal any deviation from this model. Data from normal operation is much easier to get for a process. The drawback of this approach lies in the difficulty in providing a good model that covers the different operating modes that are present during normal execution of a complex industrial process.

Improvements are therefore desired in the control and monitoring of large-scale industrial processes.

SUMMARY

The present description will concentrate on the second approach for data acquisition discussed above and describe an original method to model the process and recognize faults.

Typically, a complex industrial process is defined by a combination of dynamic states. It is very difficult to create and deploy a complete model of a process that has a behavior that is variable according to its operating mode. Often, processes have stable operating modes that are easier to model and for which monitoring detection limits can be very tight. Other operating modes may be transient which makes modeling more difficult.

The present description shows, in an aspect, how to overcome the difficulties associated with prior art methods by modeling each process state with elementary predictive models or preprocessing transformations, activated under specific operating conditions.

Instead of building a monolithic model of a complex system, the ADU (Anomaly Detection Unit) model described herein is a building block of small parts of the overall complex behavior.

According to an embodiment, there is provided a method for detecting an anomaly in data originating from a component used in an industrial process. The method comprises: providing predictive models in which at least one of the predictive models corresponds to at least one operating mode from a plurality of operating modes of the component; obtaining operating data from the component, the operating data being indicative of a given operating mode from the operating modes; selecting at least one of the predictive models based on the given operating mode; generating estimated data using the selected at least one predictive model; comparing the operating data with the estimated data; and generating an alarm trigger when the comparison meets a given anomaly criteria thereby constituting the detection of the anomaly.

According to another embodiment, there is provided a system for detecting an anomaly in data originating from a component used in an industrial process. The system comprises: a predictive model builder for providing predictive models in which at least one of the predictive models corresponds to at least one operating mode from a plurality of operating modes of the component; an input for receiving operating data from the component, the operating data being indicative of a given operating mode from the operating modes; a calculation engine for selecting at least one of the predictive models based on the given operating mode; the calculation engine further for generating estimated data using the selected at least one predictive model; and an anomaly recognition engine for comparing the operating data with the estimated data and for generating an alarm trigger when the comparison meets a given anomaly criteria thereby constituting the detection of the anomaly.

An aspect of the present description shows how to ensure optimal asset functionality in any operating mode by achieving the following objectives: early detection and localization of equipment deterioration, improving asset availability by providing better maintenance and production shutdown planning and efficiency (predictive maintenance scheduling), and reducing operating costs by improving asset efficiency.

BRIEF DESCRIPTION OF THE DRAWINGS

These and other features and aspects will become better understood with regard to the following description and accompanying drawings wherein.

DETAILED DESCRIPTION

The method is built on the principle of learning the normal behavior of any asset (also referred to as a component) in a process from pertinent measurements and recognizing subtle abnormal deviations. Asset (or component) behavior is learned by building a predictive model based on reference data acquired during operation. Predictive models are elementary data prediction entities defined by data-driven linear or nonlinear models (neural networks, nonlinear regression, kernel regression etc) associated with signature characterization and abnormal pattern recognition methods.

Figure 1:
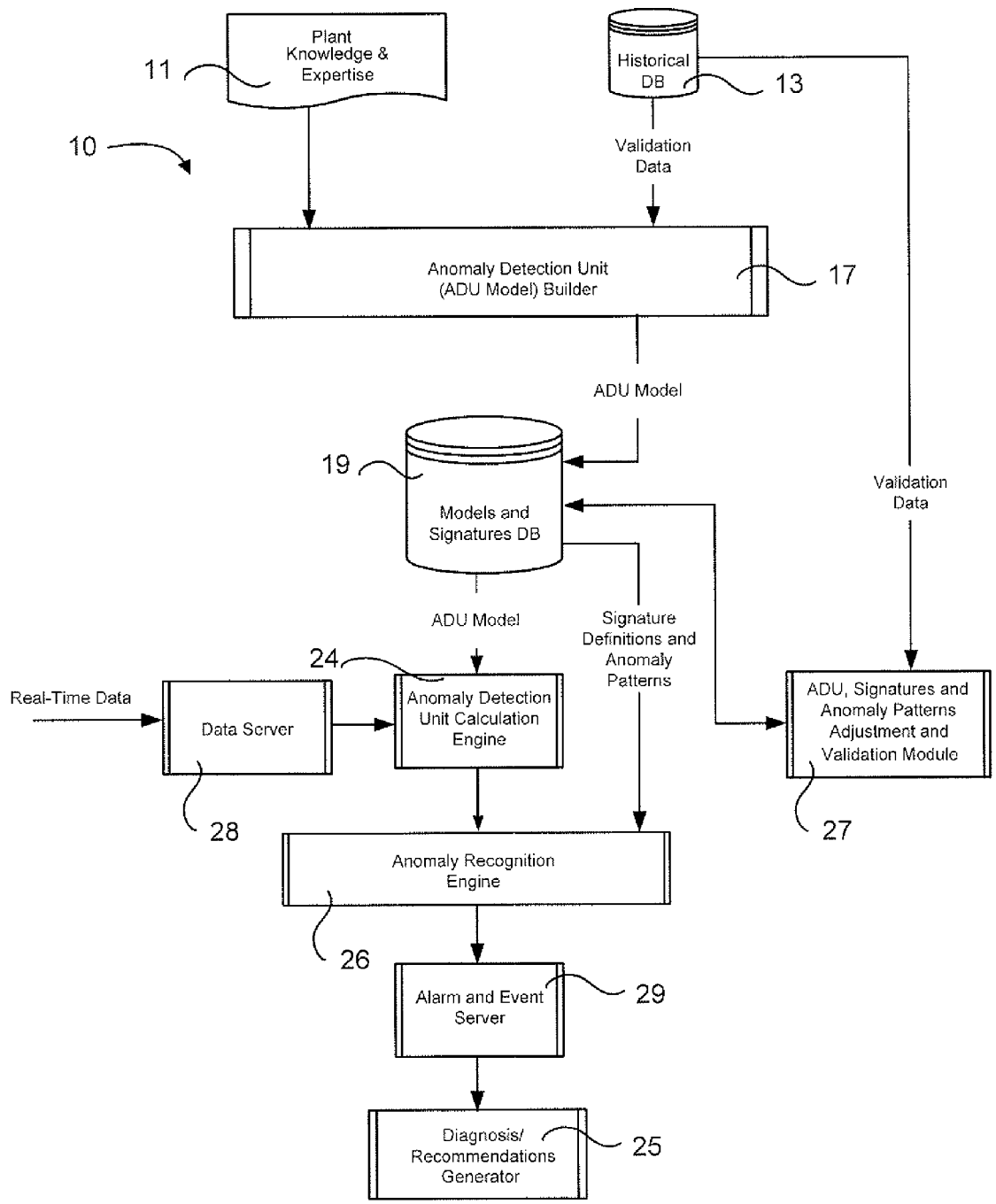
FIG. 1 is a block diagram of a system for detecting an anomaly according to the present invention.

FIG. 1 shows a block diagram of an intelligent monitoring and anomaly detection system 10. Within the scope of the present description, reference data refers to physical or chemical readings received from process sensors and stored in a historical database 13. The data is preferably organized by tag, where each value is associated with the acquisition timestamp. According to an embodiment, the historical database can take any form, such as a commercial database, a proprietary database, a spreadsheet, or a file.

Building a diagnostic strategy within the context of the description is performed in two phases; the "Learning Phase" and the "Deployment Phase". A "Validation Phase" can be added to the process. While the Validation Phase is optional it contributes to increase performance.

In the learning phase, subsets of the reference data (i.e., the learning data) are associated with plant expertise 11 to model the normal behavior of the process and detect any deviation from this normal behavior. It is the ADU model builder module 17 that creates an predictive model (also referred herein as "Anomaly Detection Unit Model" or "ADU model") of a specific behavior for a given asset. The performance of the monitoring methodology is linked to the modularity of the ADU model.

In this context, the ADU model is a predictive model that is linked to a specific operating mode for an asset, or a set of given assets. The ADU model is built from historical data (a.k.a. reference data) and plant knowledge/expertise and represents the normal behavior of the assets. A deviation from this model may be characterized as an anomaly.

Figure 2:
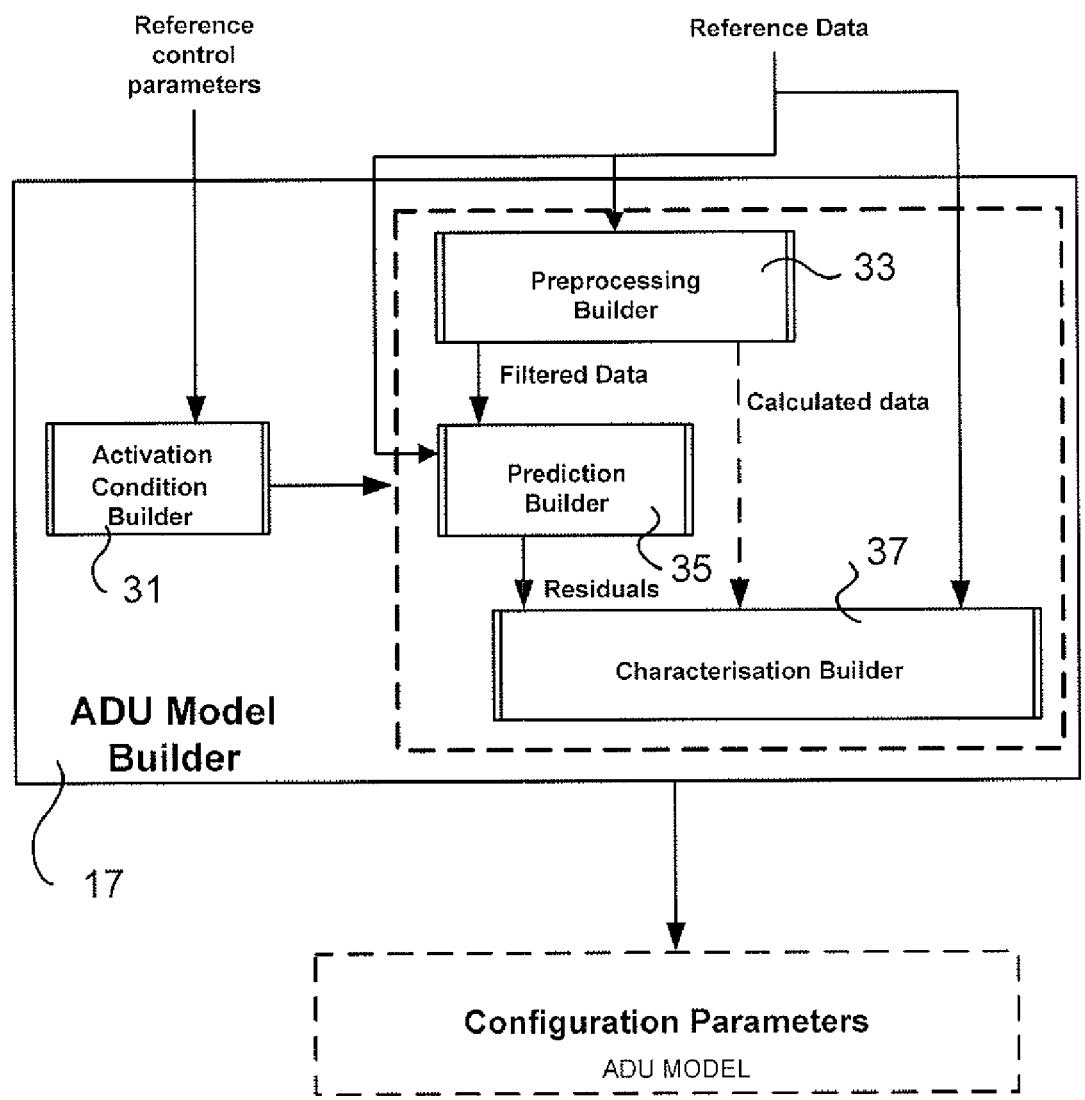
FIG. 2 is a block diagram of an anomaly detection unit builder according to the present invention.

Now turning to FIG. 2, the input flow of the ADU Model Builder 17 is the reference data. The ADU Model Builder 17 has the following elements: the Activation Condition Builder 31, the Preprocessing Builder 33, the Prediction Builder 35 and the Characterisation Builder 37. FIG. 2 depicts an embodiment of the ADU Model Builder 17, but different configurations are possible. Splitting the modeling into several ADU models reduces the need for resources and data for the learning phase while improving the overall precision. Also, it allows the user to manage problems at acceptable levels.

The Activation Condition Builder 31 is involved in the choice of a particular ADU model. From the reference data (usually one or many reference control parameters), it checks for states where a given ADU model is appropriate. For instance, an ADU model can be associated with startups, shutdowns, steady states, high or low values, etc. These are examples of modes of operation of an asset. In an embodiment, the Activation Conditions are implemented as filters. These filters are combined to automatically identify operating modes of a process or of an asset. Other implementations can use production rules. The Activation Condition Builder 31 provides an activation condition tag that will be uniquely associated with a particular ADU model, which at run-time, will allow to choose the ADU model specific to the process state. Examples of Activation Conditions of a process are start-up, shut down, load change, transition, steady state, etc.

The Preprocessing Builder 33 allows operators to transform raw data into a more significant form, when needed. Thus, the original reference or learning data are transformed in the Preprocessing Unit to filter irrelevant readings (e.g. smoothing, outlier removal, etc.), to generate numerical variables (e.g. basic numerical operations and customized equations, etc.) and to extract specific features (e.g. time domain analysis, frequency domain analysis, advanced detection operators, etc.).

The Prediction Builder 35 generates a predictive model based on both a set of reference data and filtered data. Any common practice, state-of-the-art approach can be used to provide this model. An embodiment uses a data-driven model based on a learning set of data. The values must represent the normal operating condition that need to be modeled. Within the scope of the present description, a multilayer feed-forward neural network model and linear regression are used to model the relationship between data. Other common and known data driven techniques such as kernel modeling are also well suited to the predictive modeling step. The modeling is performed in an auto-associative fashion (where each variable is modeled with all the others) or in an inferential way (where only some variables are used to model one variable). The Prediction Builder 35 generates the estimated/predicted data and uses them to produce the residuals (i.e., the difference between the reference data and predicted data).

The Characterisation Builder 37 establishes the working boundaries of the ADU model. The reference data (learning set) is used to specify the dynamic range (range of validity) of the predictive model (i.e. the data envelope for which the model was based). The residuals and the calculated data are used to assess the precision limits of the model. Usually, a model is a more or less precise reflection of the real behavior. The characterization step evaluates the acceptable error margin for the model. Any deviation to this characterization will be pointed out as an anomaly. The present embodiment characterizes a data tag with high and low limits, and a time interval inside of which these limits can be exceeded. Other approaches can include the use of the mean, the data distribution, the aging, or other process factors. The output of a Characterisation Builder 37 comprises configuration parameters which can be used to define the ADU model.

An anomaly is the set of deviations recorded for a specific timestamp, for a given characterisation. This set can be associated to an identifier, which we call a signature. The signature is a known reference used to quickly recognize an anomaly. The approach presented herein is to provide an encoding of the deviations. During an industrial process, a specific problem can results in several anomalies generated by different ADU models. Another occurrence of the same problem will produce the same anomalies and, consequently, the same signatures. When a specific problem occurs again, it will be recognized by its unique signature.

Signature definitions and anomaly patterns are created in Validation Unit 27 (see FIG. 1) to identify the specific signatures that need to be recognized. More complex schemes can also be built from signature-to-anomaly patterns that can be associated to other process problems. An anomaly pattern can describe a set of signatures occurring at the same time, or in a given sequence over time. The sequence can be in a specific order at a precise time, or in a random order over time. In an embodiment, there is specified a sequence of signatures associated with a total time interval for all those signatures to occur, and a maximal acceptable time between each individual signature.

Each ADU model is associated with an element of the asset's structural organization. When linked to the assets, a problem can be directly localized.

The output of the learning phase is a set of parameters required to completely describe the ADU model. There is also a set of signatures and anomaly patterns. The elements can be stored in a file, a database, or any other usable form.

Now returning to FIG. 1, the ADU model is saved in the Models and Signature Database 19. In the deployment phase, the ADU model is loaded to the Anomaly Detection Unit Calculation Engine 24. In an embodiment, the architecture is build around a data server 28, which maintains every active value (real-time data), as well as an alarm and events server 29. The Anomaly Detection Unit Calculation Engine 24 performs the calculations and provides results to the data server.

The real time operating data is taken from the operating process and can come from any source. The present embodiment uses a data server 28. Other implementation could take data from a database or directly from the hardware, etc.

Figure 3:
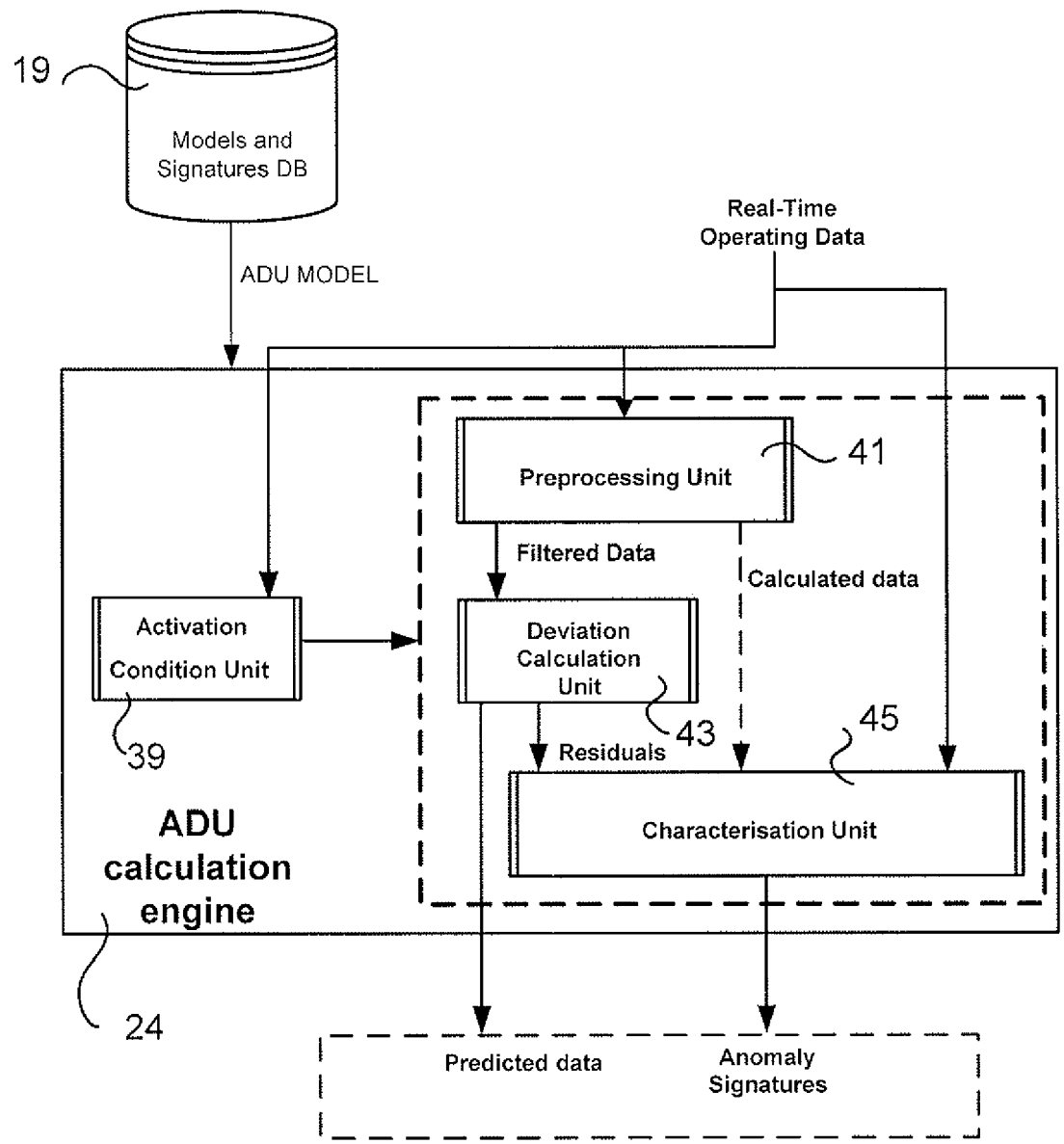
FIG. 3 is a block diagram of an anomaly detection unit according to the present invention.

With respect to FIG. 3, an embodiment of an Anomaly Detection Unit Calculation Engine 24 will be described. Real-time operating data are used to identify a particular ADU Model from the Models and Signatures Database 19. The identification of the appropriate ADU Model is made using the Activation Condition Unit 39 in the ADU Calculation Engine 24. The Anomaly Detection Unit Calculation Engine 24 will process real-time operating data through a preprocessing unit 41 that will perform operations analogous to those of the preprocessing unit 33 described above. The Deviation Calculation Unit 43 receives real-time operating data that has been filtered and predicted data from the ADU Model (input arrow not shown on FIG. 3 for clarity) and compares them in order to calculate the residuals. The residuals and the real-time data are forwarded to the Characterisation Unit 45 that uses them to calculate an anomaly signature which may comprise a set of deviations for each timestamp related to the data. Since the characterization is based on the model of the normal behavior of an asset, a deviation is related to an anomaly of this asset.

Now returning to FIG. 1, the Anomaly Recognition Engine 26 compares the anomaly signature of the ADU Model, obtained from Models and Signature Database 19, and the calculated anomaly signature to detect a match. If a match is found (i.e., it is determined that the comparison meets a given anomaly criteria), an alarm trigger is generated. The alarm trigger may result in an anomaly alert, such as an alarm. An alarm could take the form of a value switch in a status tag that triggers a User Interface (not shown) (e.g. play a sound, show or modify an image, show advisory text), an event database, or a relay trigger. It is also contemplated that the alarm trigger may be used to shut down the industrial process (manually or automatically).

The Validation Module 27 is an optional module that optimizes or adjusts the ADU parameters, the signature definitions and anomaly patterns. In an embodiment, data is received from the Historical Database 13 that contains validation data. The validation data is used to test a particular ADU model and depending on the results, the ADU parameters, signature definitions and anomaly patterns are adjusted.

Figure 4:
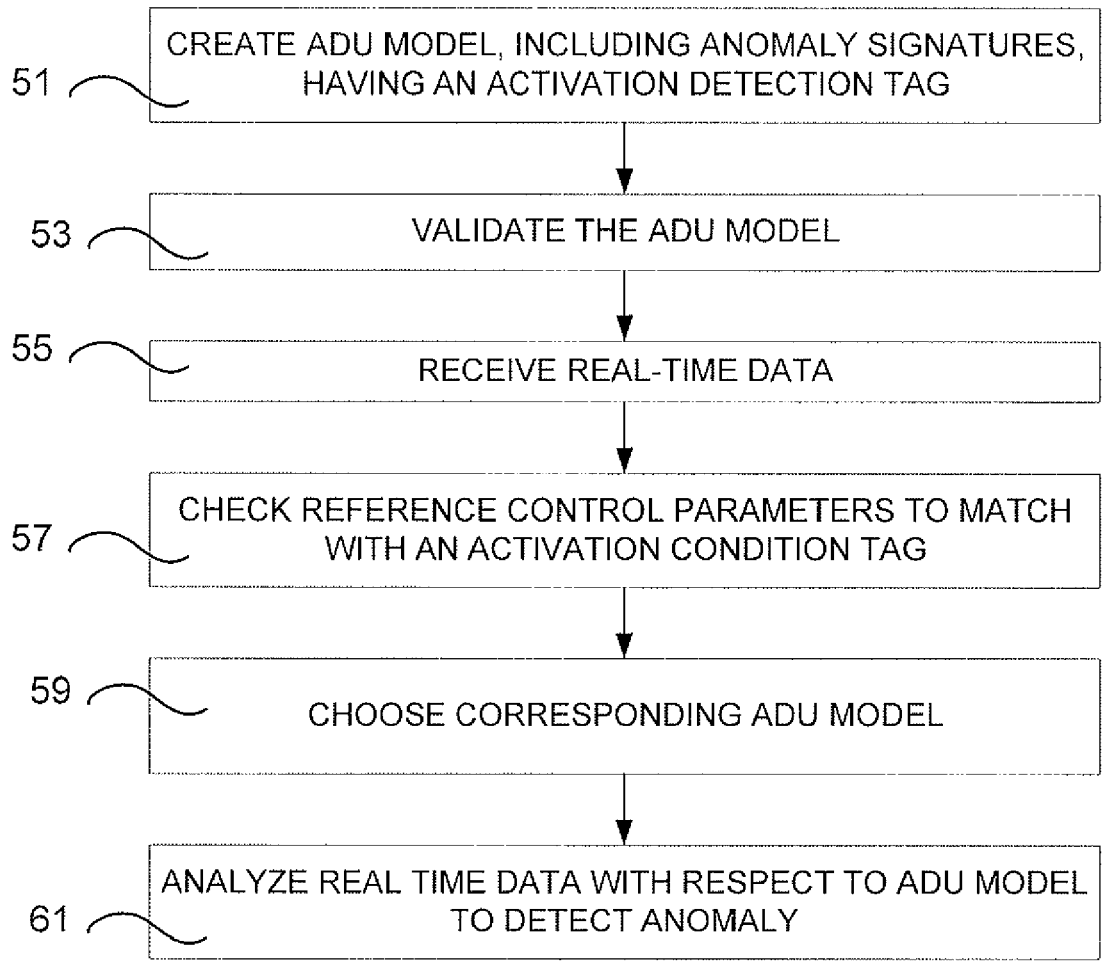
FIG. 4 is a flow chart of a method for detecting an anomaly according to the present invention.

Finally, with respect to FIG. 4, there is shown a method for intelligent monitoring and anomaly detection in data originating from a component in an industrial process. In a first step 51, an ADU model is created, including anomaly signatures and having an activation detection tag. In a next step 53, the ADU model is validated (optional). In step 55, real-time data from the execution of a process is received. In steps 57 and 59, using reference control parameters from the real-time data, a corresponding activation condition tag is found and the corresponding ADU model is selected. Finally, in step 61, the real-time data is analyzed with respect to the ADU model to detect an anomaly.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetic signal.

The embodiments described above are intended to be exemplary only. The scope of the invention is therefore intended to be limited solely by the scope of the appended claims.

The invention claimed is:

1. A method for detecting an anomaly in data originating from a component used in an industrial process, the method comprising steps of:
    providing predictive models in which at least one of the predictive models corresponds to at least one operating mode from a plurality of operating modes of the component;
    providing, for each one of said predictive models, anomaly signatures each representative of a first set of deviations from a respective one of the predictive models for a specific timestamp;
    obtaining operating data from the component, the operating data being indicative of a given operating mode from the operating modes;
    selecting one of the predictive models based on the given operating mode;
    generating an operating data signature by comparing the operating data with the selected predictive model, said operating signature being representative of a second set of deviations of said operating data from said selected predictive model for said specific timestamp; and
    generating an alarm trigger when the operating data signature matches one of the anomaly signatures associated with the selected predictive model, thereby constituting the detection of the anomaly;
    wherein at least one of the steps is performed by a processor.

2. The method of claim 1, wherein said providing said anomaly signatures comprises associating each of said anomaly signatures with a specific problem for the component.

3. The method of claim 2, further comprising identifying said anomaly as being said specific problem.

4. The method of claim 1, further comprising building the predictive models.

5. The method of claim 4, wherein the building further comprises generating estimated data from reference operating data; and producing residuals by calculating differences between the reference operating data and the generated estimated data.

6. The method of claim 5, wherein the building further comprises determining, from the reference data, the plurality of operating modes for the component.

7. The method of claim 6, wherein the building further comprises identifying the training operating mode from the plurality of operating modes and using the predictive model which corresponds to the identified training operating mode in the generating of estimated data.

8. The method of claim 7, wherein the building further comprises using the reference data to specify the range of validity of the plurality of predictive models.

9. The method of claim 8, wherein the range specification further comprises providing at least one of a data tag with high and low limits and a time interval for the limits; a data mean; a data distribution; and a data aging.

10. The method of claim 9, wherein the building further comprises preprocessing the reference data by performing at least one of filtering irrelevant readings, generating numerical variables and extracting specific features.

11. The method of claim 7, wherein the building further comprises using the residuals and calculated data to assess the precision limits of the model.

12. The method of claim 1, further comprising identifying, from the operating data, the given operating mode from the plurality of operating modes.

13. The method of claim 1, further comprising using the alarm trigger to perform at least one of shutting down an industrial process, and switching a value in a status tag that triggers an event on a User Interface, an event database, or a relay trigger.

14. The method of claim 1, wherein the component comprises plurality of components.

15. A system for detecting an anomaly in data originating from a component used in an industrial process, the system comprising:
at least one processor comprising an input for receiving operating data from the component, the operating data being indicative of a given operating mode from a plurality of operating modes of the component, and configured as:
a predictive model builder for providing predictive models in which at least one of the predictive models corresponds to at least one of the plurality of operating modes, and for each one of said predictive models, providing anomaly signatures each representative of a first set of deviations from a respective one of the predictive models for a specific timestamp;
a calculation engine for selecting one of the predictive models based on a given operating mode from the operating modes and generating an operating data signature by comparing the operating data with the selected predictive model, said operating signature being representative of a second set of deviations of said operating data from said selected predictive model for said specific timestamp; and
an anomaly recognition engine for generating an alarm trigger when the operating data signature matches one of the anomaly signatures associated with the selected predictive model, thereby constituting the detection of the anomaly.

16. The system of claim 15, wherein the predictive model builder is adapted for providing said anomaly signatures each associated with a specific problem for the component.

17. The system of claim 16, further comprising a diagnosis generator for identifying said anomaly as being said specific problem.

18. The system of claim 15, further comprising a predictive model builder for building the predictive models.

19. The system of claim 18, wherein the predictive model builder comprises a prediction builder for generating estimated data from reference operating data; and producing residuals by calculating differences between the reference operating data and the generated estimated data.

20. The system of claim 19, wherein the predictive model builder further comprises an activation condition builder for determining, from the reference data, the plurality of operating modes for the component.

21. The system of claim 20, wherein the activation condition builder is further for identifying the training operating mode from the plurality of operating modes and using the predictive model which corresponds to the identified training operating mode in the generating of estimated data.

22. The system of claim 21, wherein the predictive model builder further comprises a characterisation builder for using the reference data to specify the range of validity of the plurality of predictive models.

23. The system of claim 22, wherein the characterisation builder is further for providing at least one of a data tag with high and low limits and a time interval for the limits; a data mean; a data distribution; and a data aging.

24. The method of claim 22, wherein the characterization builder further uses the residuals and calculated data to assess the precision limits of the model.

25. The system of claim 22, wherein predictive model builder further comprises a preprocessing builder for preprocessing the reference data by performing at least one of filtering irrelevant readings, generating numerical variables and extracting specific features.

26. The system of claim 15, wherein the calculation engine is further for identifying, from the operating data, the given operating mode from the plurality of operating modes.

27. The system of claim 15, wherein the anomaly recognition engine is further for using the alarm trigger to perform at least one of shutting down an industrial process, and switching a value in a status tag that triggers an event on a User Interface, an event database, or a relay trigger.

* * * * *